May 4, 1937.    H. LEDWINKA    2,079,218
CONNECTIONS OF THE DRIVING UNIT TO THE FRAME OF A MOTOR VEHICLE
Filed Nov. 26, 1934    3 Sheets-Sheet 1
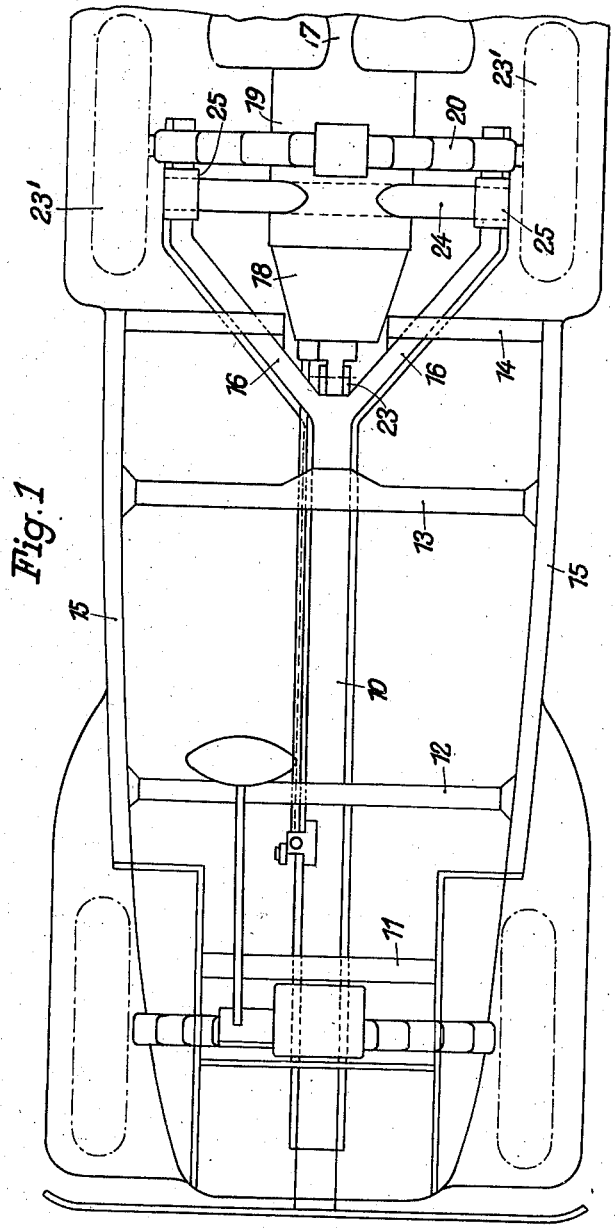
INVENTOR
HANS LEDWINKA.
BY
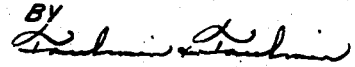
ATTORNEYS

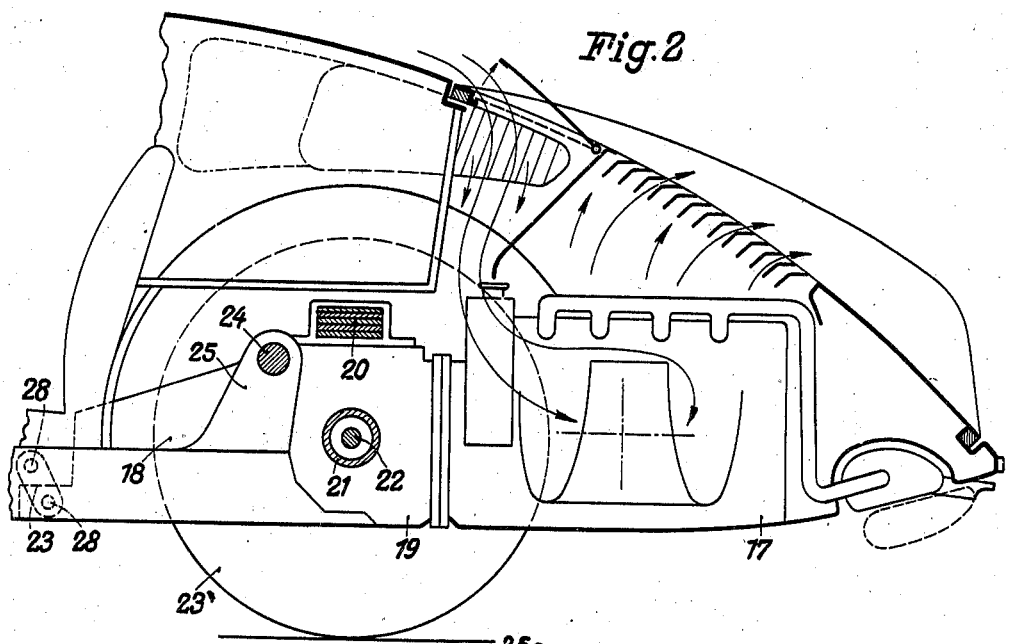
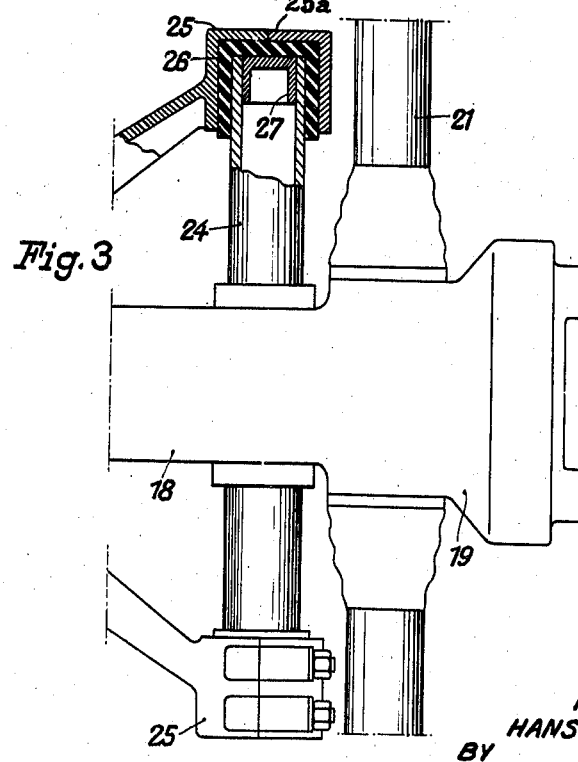

May 4, 1937.  H. LEDWINKA  2,079,218
CONNECTIONS OF THE DRIVING UNIT TO THE FRAME OF A MOTOR VEHICLE
Filed Nov. 26, 1934   3 Sheets-Sheet 3

Inventor:
HANS LEDWINKA,
BY
Toulmin & Toulmin
ATTORNEYS

Patented May 4, 1937

2,079,218

UNITED STATES PATENT OFFICE 2,079,218

CONNECTIONS OF THE DRIVING UNIT TO THE FRAME OF A MOTOR VEHICLE

Hans Ledwinka, Koprivnice, Czechoslovakia

Application November 26, 1934, Serial No. 754,759
In Germany December 17, 1932

7 Claims. (Cl. 180—54)

This invention relates to the connection of the driving unit to the frame of a motor vehicle of which the wheels are driven from the driving unit by floating axles, and, in accordance with the invention, the driving unit and the frame of the vehicle are connected by members which can swing in the direction of travel, and intermediate resilient layers are preferably interposed in these members. The connection is preferably effected by means of straps such as are used for connecting the vehicle body and vehicle frame. By means of the invention the result is obtained that, if the wheels are given a blow, the driving unit together with the axle shafts driven by it can make a certain amount of swinging movement relatively to the frame in the direction of travel without the danger of any parts being damaged and without the passengers experiencing any unpleasant consequences owing to the blow on the wheels. This form of connection has the further advantage that any expansion of the driving unit due to heat has no effect on the connection between the driving unit and the frame of the vehicle. Finally, the driving unit can be released from the frame of the vehicle very easily. The springs for supporting the wheels may also be fixed to the driving unit which consists only of the engine or of the engine and change speed gear or of a driving shaft and change speed gear or the like.

The invention consists further in that, in the case of a vehicle having a forked extension of the frame, one of the bearings or supports for the driving unit is provided on the end portion of each arm of the fork and a further bearing is provided in the middle of the fork or at the end of the central supporting member. When the driving unit is supported in this manner it can be simply removed after releasing the connecting parts and is easily accessible from the end of the vehicle. The supports or bearings of the driving unit are preferably such that a strap connection is provided only at the front bearing or support while the engine unit is directly connected to the ends of the two arms of the fork with the aid of bearings which are preferably cylindrical and lined with yielding material.

Further details and advantages of the invention will be clear from the forms of construction which are illustrated by way of example in the accompanying drawings and are hereinafter described.

In the drawings:—

Figure 1 is a plan of a vehicle in which the engine unit and chassis are connected in accordance with the invention;

Figure 2 illustrates the rear part of this vehicle in side view, the rear parts of the side walls of the vehicle body being omitted, and Figure 3 is a part sectional plan showing the bearings or supports of the driving unit on a larger scale.

Figure 4:
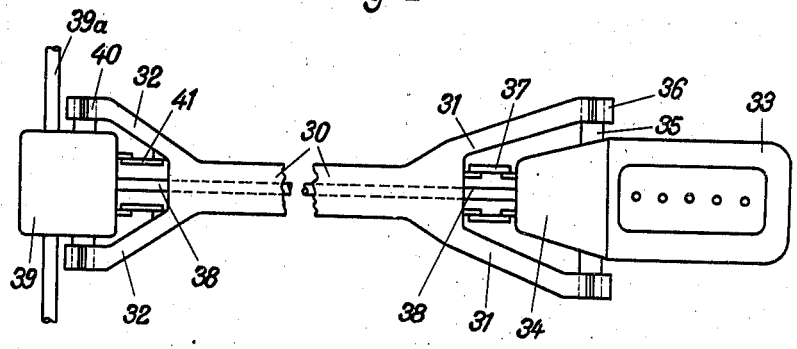
Figures 4 and 5 are partial diagrammatic plan views of two modifications.

Referring to the drawings, the frame or chassis of the vehicle comprises a central supporting member 10, which is of box section and made of metal plate, and similarly-shaped cross members 11—14 which form the base frame-work of the body and side members 15. The central supporting member 10 is forked at the rear so as to form two arms 16 which are also of box section.

The driving unit comprising the engine 17, the change speed gear 18 and the axle gearing 19 arranged between them, and also the transverse springs 20, the floating half shafts 21 and floating axles 22, the wheels 23' and other driving members, is attached on the one hand at the point where the central supporting member forks to strengthening members which are provided at this place through the agency of straps 23. On the other hand, the driving unit is connected to a cross support 24, the ends of which are carried in bearings 25 which are rigidly connected to the ends of the fork 16. The frame of the vehicle is thus, as it were, suspended from the driving unit.

The form of the bearing of the cross support 24 in the bearing bracket 25 will be seen from Figure 3. The bearings are made in two parts. They are lined on the inside with a rubber sleeve or lining 26 which encloses not only the cylindrical parts of the ends of the tubular cross support but also abuts against the end face of the tube which is closed by a plug 27 which is inserted in the end.

Owing to the form of bearing which has been described, any movements and vibrations of the engine unit in all three planes at right angles to one another through the points of suspension are entirely absorbed and elastically damped. The assembly also is considerably facilitated since the entire driving unit can be disconnected from the vehicle merely by removing the cover 25a of the bearing.

Obviously, the same arrangement can be utilized for vehicles in which the driving unit is mounted in the front of the vehicle or for vehicles in which the engine and the change speed gear are arranged at one end of the vehicle and the driving axles at the other end. With the latter form of construction, the engine together with the change speed gear and the driving axles are each carried in a fork in the manner described while the connecting shaft is passed through the tube. Figure 4 shows a central supporting member 30 continued at each end by fork arms 31 and 32, respectively. Between the arms 31 a driving unit is inserted, comprising a motor 33 and the change speed gear 34. Lateral transverse extensions 35 of said driving unit are supported in bearings 36 of the ends of the arms 31 in the same manner as the ends of the transverse member 24 in Figure 3. Between that end of the driving unit and the girder 30, lying toward the transverse middle plane of the vehicle, straps 37 are inserted. These straps correspond to the straps 23 shown and described in the first embodiment. A longitudinal driving shaft 38 is inserted between the change speed gear and the axle gear 39 driving the axle shaft 39a, the axle gear being supported by the arms 32. The axle gear 39 is supported by cross arms 40 and straps 41 in the same manner as the driving unit at the other end of the vehicle.

Figure 5:
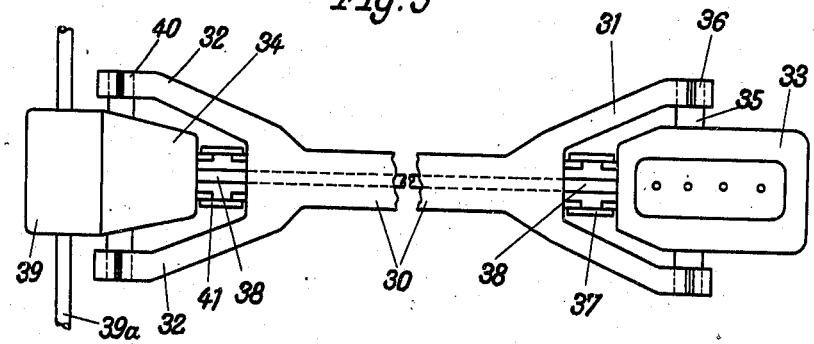

Figure 5 corresponds to the embodiment shown in Figure 4, differing therefrom in that the one driving unit comprises substantially only the motor, whereas the driving unit on the other end of the car combines the change speed gear 34 and the axle gear 39.

The invention is particularly suitable for vehicles in which the wheels can move upwards and downwards independently of one another, in which case the swinging axles or arms which carry the wheels, the lever links and preferably also the springs which carry the wheels or support themselves against them are connected to the driving unit arranged in the manner indicated. In some cases wheels which are not driven and are independently movable upwards and downwards can be connected with the chassis in the manner described with the use of a suitable intermediate member. The bolts 28 which connect the straps 23 with the driving unit and the frame 10 are preferably provided with so-called silent blocks.

I claim:—

1. In an automobile comprising a chassis and a driving unit from which the wheels are driven through the agency of floating axle shafts, the means for connecting the driving unit to the chassis comprising cross supporting shafts attached to the driving unit, bearings attached to the chassis in which the said cross shafts are carried, and a strap pivoted to an end of the driving unit and to the chassis.

2. In an automobile comprising a chassis and a driving unit from which the wheels are driven through the agency of floating axle shafts, the means for connecting the driving unit to the chassis comprising cross supporting shafts attached laterally to the driving unit, bearings attached to the chassis in which the said cross shafts are carried, a resilient lining interposed between the bearings and the cross shafts, and a strap, or straps, pivoted to an end of the driving unit and to the chassis.

3. In an automobile comprising a chassis having a central longitudinal member which is forked at one end and a driving unit from which the wheels are driven through the agency of floating axle shafts, the means for connecting the driving unit to the chassis which comprises cross supporting shafts attached to the driving unit, bearings attached to the ends of the forks in which the cross shafts are carried, resilient members interposed between said cross shafts and said bearings, and a strap, or straps, pivoted to an end of the driving unit and to the end of the central longitudinal member.

4. An automobile in accordance with claim 3, wherein the bearings are closed at the ends and the resilient lining covers the end faces of the said cross-shafts.

5. In an automobile comprising a chassis having a central longitudinal member which is forked at both ends and the engine and change speed gear are arranged as a unit at one end of the chassis and the driving gear and floating axles are arranged as a unit at the other end of the chassis the means for connecting each of the said units to the chassis which comprises cross supporting shafts attached to the units, bearings attached to the ends of the forks in which the cross shafts are carried, resilient linings interposed between said cross shafts and said bearing and straps pivoted to the ends of the units and to the places where the central longitudinal member forks.

6. In an automobile comprising a chassis having a central longitudinal member which is forked at both ends and the engine is arranged as a unit at one end of the chassis and the change speed gear and the driving gear and floating axles are arranged as a unit at the other end of the chassis, the means for connecting each of the said units to the chassis which comprises cross supporting shafts attached to the units, bearings attached to the ends of the forks in which the cross shafts are carried, resilient linings interposed between said cross shafts and said bearings and straps pivoted to the ends of the units and to the places where the central longitudinal member forks.

7. In an automobile comprising a chassis and a driving unit from which the wheels are driven through the agency of floating axle shafts, the means for connecting the driving unit to the chassis comprising cross supporting shafts attached laterally to the driving unit at a distance from the ends of the unit, bearings attached to the chassis in which the said cross shafts are carried, and a strap pivoted to an end of the driving unit and to the chassis.

H. LEDWINKA.